(No Model.)

C. M. BROWN & E. P. HOLDEN.
CAN BODY.

No. 598,555. Patented Feb. 8, 1898.

Witnesses:
Frank S. Blanchard
DeWitt W. Chamberlin

Inventors
Charles M. Brown
Edward P. Holden
By Walter H. Chamberlin
Attorney

THE NORRIS PETERS CO., PHOTO-LITHO., WASHINGTON, D. C.

UNITED STATES PATENT OFFICE.

CHARLES M. BROWN AND EDWARD P. HOLDEN, OF CHICAGO, ILLINOIS.

CAN-BODY.

SPECIFICATION forming part of Letters Patent No. 598,555, dated February 8, 1898.

Application filed February 19, 1897. Serial No. 624,150. (No model.)

*To all whom it may concern:*

Be it known that we, CHARLES M. BROWN and EDWARD P. HOLDEN, citizens of the United States, residing at Chicago, county of Cook, State of Illinois, have invented a certain new and useful Improvement in Can-Bodies; and we declare the following to be a full, clear, and exact description of the invention, such as will enable others skilled in the art to which it pertains to make and use the same, reference being had to the accompanying drawings, which form a part of this specification.

Heretofore in the construction of tin-can bodies it has usually been customary to first take a rectangular sheet of tin and first form on the edges thereof suitable flanges which when brought together would interlock, then to wrap the sheet around a horn or other former, then cause the seams to interlock, then "bump" them to permanently unite them, and then remove the can from the horn; but in order to accomplish these objects it has usually been necessary either to make the horn collapsible, so that after the blank was wrapped around it and the seam united its diameter could be reduced and the formed body easily removed, or else it has been necessary to make the horn of smaller diameter than that of the body formed around it and unite the seam in some other way than by what is technically termed "bumping" it.

Our present invention has for its object the production of a can-body blank so formed that it can be wrapped closely around the surface of a solid horn and then by a single blow of a "bumper" the end flanges be permanently united to form the side seam of the body, while the same blow of the bumper will enlarge the diameter of the body enough so that it can be easily removed from the horn around which it was originally wrapped. This is accomplished by forming in the body of the blank, preferably when the end flanges are formed, an excess of metal, preferably in the form of a bead of metal throughout the width of the blank and preferably close to one of the end flanges, so that the blow of the bumper which unites the flanges will at the same time flatten out this bead and thus enlarge the diameter of the body already formed.

Figure 1:
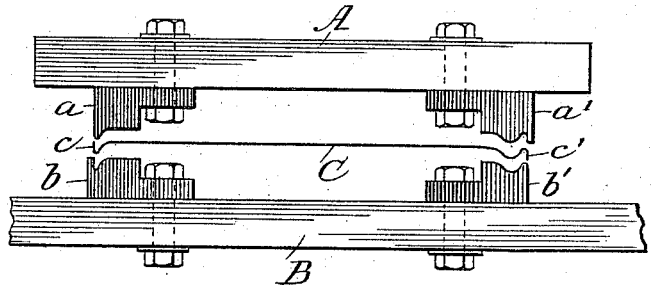
Figure 2:
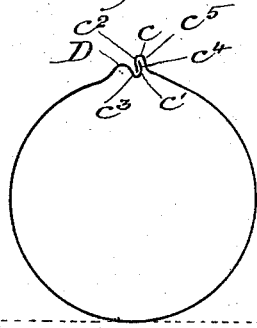
Figure 3:
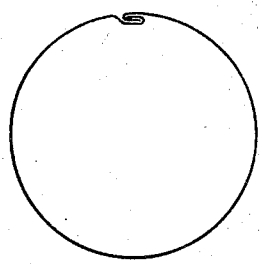
Figure 4:
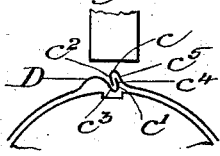
Figure 5:
Figure 6:
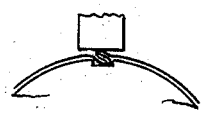
Figure 7:
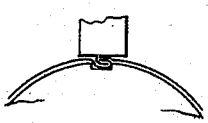

In the drawings, Figure 1 illustrates one form of apparatus whereby the blank is stamped to the desired shape. Fig. 2 shows by dotted lines the form of the blank before it is wrapped around the horn and in full lines the shape after it has been wrapped, but before it has been "bumped." Fig. 3 shows a form of the seam after it has been bumped. Figs. 4, 5, 6, and 7 show the various stages of the work in bumping the seam.

In carrying out the invention we have illustrated in Fig. 1 one form of apparatus whereby the blank may be properly shaped. In this figure, A represents a suitable head, carrying dies $a\ a'$, and B represents another head, carrying dies $b\ b'$, one or both of said heads being reciprocatory, so that when the flat blank is placed between them the dies will stamp it, as shown in Fig. 1.

C represents the blank, having on one end the turned-up flange $c$ and on the other end the turned-up flange $c'$. Adjacent to the flange $c'$, and preferably extending substantially the width of the blank or what would be the length of the can-body after it is formed, is a rounded bead D. Now by reference to Figs. 4, 5, 6, and 7 it will be seen that after the body has been wrapped around the horn E the flange $c$ would be above the flange $c'$, but beyond it, so that when the flange $c$ is pressed downward it will interlock with the flange $c'$. The bumper now comes down and presses the flange $c$ down against the face of the flange $c'$, and the end $c^2$ of the flange $c$ will bear upon the portion $c^3$, while the ends $c^4$ will bear upon the portion $c^5$. At the same time the bumper is exerting a pressure on the bead D, which will necessarily give more or less of a lateral movement to the flange $c'$ and bring it with more or less pressure against the portion $c^5$. This will tend to bend each flange $c\ c'$ upon itself until the two flanges assume the position shown in Figs. 3 and 7, when a continued movement of the bumper will lock them in this position. Meanwhile the pressure of the bumper on the bead D has flattened the latter out, so that the diameter of the can-body is sufficiently enlarged to enable it to be readily slipped off from the forming-horn E.

At this point we wish to call attention to one significant fact in the construction of our blank—namely, that the flanges c c' may be formed with a single stamping. This is because with our blank the flanges c c' can be made parallel with each other and at right angles to the plane of the blank and still be bumped together to form the seam by a single blow of the bumper.

It is obvious that in carrying out our invention many different forms of apparatus may be employed to shape the blank, many different forms of apparatus may be employed to wrap the blank around the horn, many different forms of horns may be used, and many different forms of bumping or seam-forming apparatus be used without departing from the spirit of our invention, which consists in forming the blank with an excess of metal therein, said excess adapted to be pressed out of sight when the seam is formed or after it is formed to enlarge the diameter of the body. So, also, while in the claims hereof we have spoken of the blank being formed with a bead therein, we wish to be understood by said term "bead" to mean any excess of metal beyond or outside of the contour of the body itself, which when flattened or pressed into the contour of the body will enlarge the diameter thereof.

What we claim is—

1. A can-body formed with a bead in the body thereof for the purpose of enlarging the diameter of the body during the manufacture thereof, substantially as described.

2. A can-body formed with a bead in the body thereof adjacent to one of the seam-flanges for the purpose of enlarging the diameter of the body during the manufacture thereof, substantially as described.

3. A can-body formed with a rounded bead D for the purpose of enlarging the diameter during manufacture, a flange c' closely adjacent thereto pointing in the same direction as the convex surface of the bead D and a flange c at the other end of the blank pointing in the opposite direction, substantially as described.

4. A blank for a sheet-metal can-body formed with a lock-seam flange on each end, the faces of one flange being in a plane parallel with the faces of the other and a bead adjacent to one flange to be pressed into the contour of the body when the seam is formed, substantially as described.

In testimony whereof we sign this specification in the presence of two witnesses.

CHARLES M. BROWN.
EDWARD P. HOLDEN.

Witnesses:
WALTER H. CHAMBERLIN,
DE WITT M. CHAMBERLIN.